United States Patent
Burkhardt

(10) Patent No.: US 7,422,416 B2
(45) Date of Patent: Sep. 9, 2008

(54) DEVICE FOR EFFECTING HEAT TRANSFER TO ROTATING EQUIPMENT, IN PARTICULAR GAS TURBINES

(75) Inventor: Claus Burkhardt, Eching (DE)

(73) Assignee: MTU Aero Engines GmbH, Munich (DE)

( * ) Notice: Subject to any disclaimer, the term of this patent is extended or adjusted under 35 U.S.C. 154(b) by 279 days.

(21) Appl. No.: 10/545,834

(22) PCT Filed: Dec. 19, 2003

(86) PCT No.: PCT/DE03/04193

§ 371 (c)(1),
(2), (4) Date: Oct. 3, 2005

(87) PCT Pub. No.: WO2004/074638

PCT Pub. Date: Sep. 2, 2004

(65) Prior Publication Data
US 2006/0245917 A1 Nov. 2, 2006

(30) Foreign Application Priority Data
Feb. 19, 2003 (DE) ................ 103 06 820

(51) Int. Cl.
*F01D 5/08* (2006.01)

(52) U.S. Cl. .................. 415/62; 415/61; 415/69; 415/141; 415/176

(58) Field of Classification Search ............. 415/60–62, 415/65, 66, 68, 69, 140, 141, 176–178; 416/124–126, 416/128–130, 132 A, 132 R, 134 R, 135, 416/240; 165/88–90
See application file for complete search history.

(56) References Cited

U.S. PATENT DOCUMENTS

| 2,505,660 | A | * | 4/1950 | Baumann ................ 416/129 |
| 2,998,099 | A | * | 8/1961 | Hollingsworth ......... 415/182.1 |
| 3,080,824 | A | * | 3/1963 | Boyd et al. .............. 415/141 |
| 3,363,831 | A | * | 1/1968 | Garnier .................... 415/65 |
| 3,538,657 | A | * | 11/1970 | Macrow .................. 415/141 |

(Continued)

FOREIGN PATENT DOCUMENTS

EP    0 563 404  B1    4/1997

(Continued)

OTHER PUBLICATIONS

International Search Report of PCT/DE2003/004193 ,dated May 19, 2004, 6 pages.

*Primary Examiner*—Christopher Verdier
(74) *Attorney, Agent, or Firm*—Davidson, Davidson & Kappel, LLC

(57) ABSTRACT

A device for effecting heat transfer to rotating equipment, in particular gas turbines, is provided. A gas turbine (10) comprises a first rotating unit (11), i.e. an internal shaft and a second fixed unit (16), i.e. a housing. A third rotating unit (14, 17), i.e. rotor blades and plates connected to the rotor blades are disposed between the first unit (11) and the second unit (16). The first (11) and third (14, 17) units are rotatable around a common axis (12) and with respect to each other. At least one device (21) for improving heat transfer by convection is assigned to the first rotating unit (11), i.e. the internal shaft.

6 Claims, 2 Drawing Sheets

U.S. PATENT DOCUMENTS 4,274,261 A * 6/1981 Horgan .................. 415/65
4,790,133 A * 12/1988 Stuart .................... 415/65
4,809,498 A    3/1989 Giffin, III et al.
4,902,196 A * 2/1990 Byrd ..................... 415/141
4,919,590 A    4/1990 Stratford et al.
5,993,158 A * 11/1999 Young ................... 416/132 R

FOREIGN PATENT DOCUMENTS

EP    1 006 261    6/2000
FR      933 000    4/1948

* cited by examiner

DEVICE FOR EFFECTING HEAT TRANSFER TO ROTATING EQUIPMENT, IN PARTICULAR GAS TURBINES

FIELD OF THE INVENTION

The present invention relates to a system for affecting the heat transfer in rotating equipment.

BACKGROUND

Gas turbines used as propulsion units in aircrafts, for example, usually include a plurality of rotating blades arranged in series in the axial direction of the gas turbine. The rotating blades are surrounded by a stationary housing. A gap, which should have the smallest possible dimensions to avoid gas turbine efficiency losses, is formed between the rotating blades and the housing.

The rotating blades and the stationary housing have different temperature variations over time. Thus, as heat is generated during operation of the gas turbine, in particular in non-steady-state operation of the gas turbine, the rotating blades and the stationary housing expand to different degrees. This may result in enlargement of the gap between the rotating blades and the housing.

In rotating equipment, such as gas turbines, the different degrees of expansion of stationary units and rotating units should be compensated. This may be achieved by improving the heat transfer between the stationary units and the rotating units. Improved heat transfer between the stationary units and the rotating units equalizes the temperature variations over time and heat absorption, and thus ultimately the expansion of stationary and rotating units. For gas turbines this would mean that the rotating blades and housing expand equally or evenly even during non-steady-state operation of the gas turbine, whereby the size of the gap between the rotating blades and the housing is ideally no longer subject to fluctuations.

SUMMARY OF THE INVENTION

On this basis, an object of the present invention is to provide a novel system for affecting the heat transfer in rotating equipment. Furthermore, it is an object of the present invention to provide a corresponding gas turbine.

In accordance with an embodiment of the present invention, a system for affecting the heat transfer in rotating equipment (for example, a gas turbine) comprises a rotating first unit, a stationary second unit, and a rotating third unit situated between the first unit and the second unit. The first unit and the third unit rotate about a common axis, and the first unit and the third unit rotate relative to one another. At least one device is associated with the first rotating unit. and the at least one device is positioned to improve convective heat transfer in the rotating equipment. The different temperature variations over time of the units are thus improved.

In accordance with another embodiment of the present invention, a gas turbine comprises a rotating inner shaft, a stationary housing, and a rotor assembly. The rotor assembly includes a plurality of rotating blades, and the rotating blades, the rotor assembly, and the inner shaft rotate about a common axis and relative to one another. At least one device is associated with the inner shaft, and the at least one device is positioned to improve convective heat transfer in the gas turbine.

The gas turbine has a rotating inner shaft, a stationary housing, and a rotor assembly having a plurality of disks, each having a plurality of rotating blades, the rotating blades and the inner shaft rotating about a common axis at different speeds and possibly in different directions with respect to one another. At least one device for improving the convective heat transfer is associated with the inner shaft according to the present invention. The rotating blades and the housing thus expand more evenly even during non-steady-state operation of the gas turbine. The radial gap between the rotating blades and the housing is thereby reduced, which reduces efficiency losses of the gas turbine.

According to an advantageous refinement of the present invention, a plurality of rotating blades is arranged in series in the axial direction of the gas turbine. A component extending between the rotating blades and the inner shaft, namely a disk, is associated with each rotating blade. Two adjacent disks delimit a rotating chamber. A plurality of devices for improving convective heat transfer arranged in series in the axial direction are associated with the inner shaft, the devices extending radially from the inner shaft into the chambers delimited by the disks. The devices for improving convective heat transfer are designed as flexible elements whose external shape changes as they rotate. The devices improve, i.e., enhance the flow through the chambers, and thus increase the convective heat transfer in the rotating chambers.

BRIEF DESCRIPTION OF THE DRAWINGS

An exemplary embodiment of the present invention is explained on the basis of the drawing without being limited thereto.

DETAILED DESCRIPTION

Figure 1:
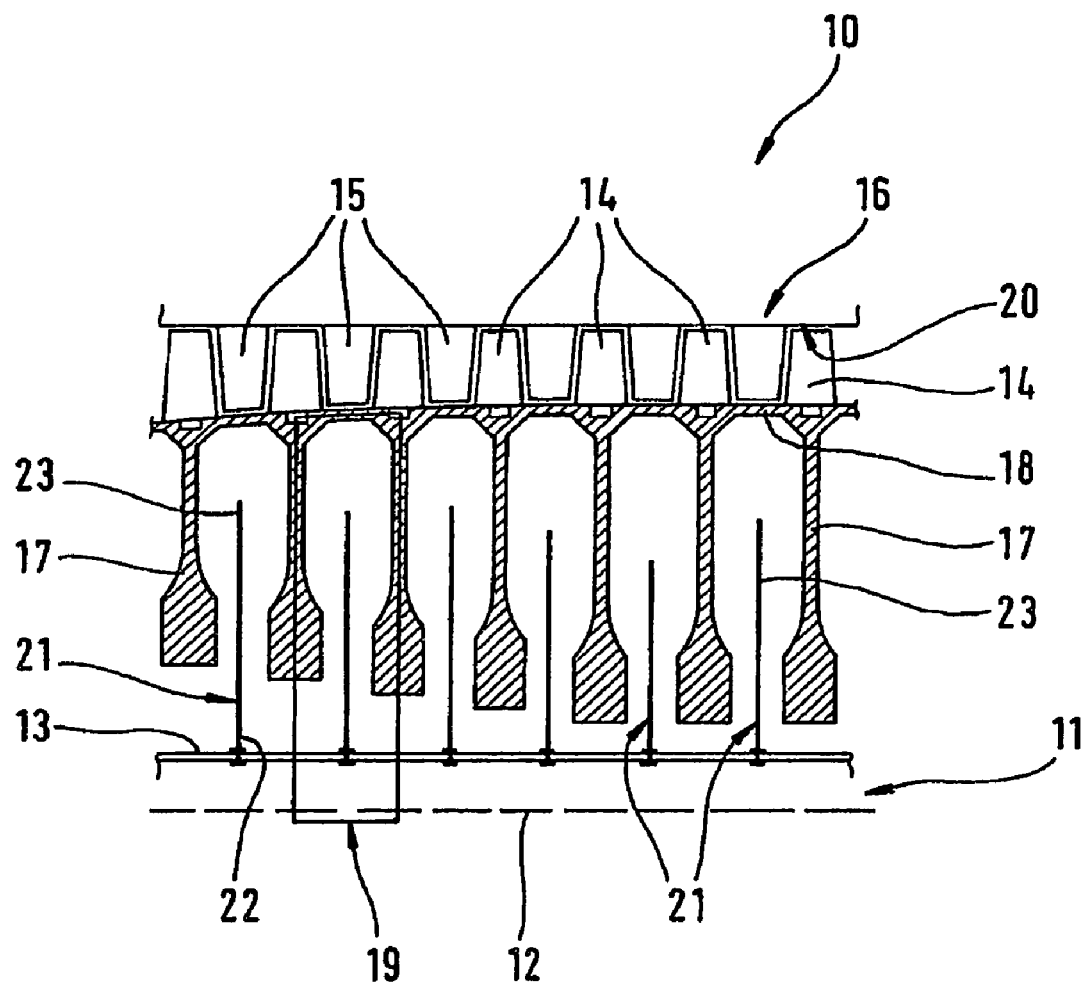
FIG. 1 shows a schematic cross section of a detail of a gas turbine according to the present invention.

FIG. 1 shows a gas turbine 10 according to the present invention. Gas turbine 10 has a rotating inner shaft 11, FIG. 1 showing an axis of rotation 12 of inner shaft 11 and a wall 13 of the same. Gas turbine 10 also has a plurality of rotating blades 14 arranged in series in the axial direction. A stationary series of guide vanes 15 is positioned between each adjacent series of rotating blades 14. A stationary housing 16 delimiting gas turbine 10 to the outside is adjacent to rotating blades 14 and guide vanes 15.

Rotating blades 14 rotate about the same axis of rotation 12 as inner shaft 11. As mentioned previously, guide vanes 15 and housing 16 are stationary, i.e., non-rotating. A gas turbine having a rotating inner shaft 11 is a medium-pressure or high-pressure component.

As apparent from FIG. 1, a disk 17 extending toward inner shaft 11 is associated with each rotating blade 14. Disks 17 are fixedly attached to rotating blades 14 and rotate together with rotating blades 14 about axis of rotation 12. Disks 17 are fixedly connected to one another by a shroud 18. Shroud 18 also rotates together with rotating blades 14 and disks 17 about axis of rotation 12.

Each pair of adjacent rotating disks 17 delimits a chamber extending between inner shaft 11 and shroud 18. Such a chamber is labeled with reference number 19 in FIG. 1. Chambers 19 therefore delimit a defined volume. Chambers 19 rotate about axis of rotation 12.

In such a gas turbine 10, a gap is formed between an outer wall 20 of rotating blades 14 and housing 16. This gap should be as small as possible to avoid efficiency losses. It is important to note in this context that the gap between rotating blades 14 and housing 16 should have the smallest possible dimensions during the entire operation of gas turbine 10. However, since the rotating units of gas turbine 10, in particular rotating blades 14 and rotating disks 17, have temperature variations over time that are different from those of the stationary units, in particular those of stationary housing 16, the gap between rotating blades 14 and housing 16 is subject to changes in the gas turbines of the related art.

Specifically, during acceleration, housing 16 according to the related art expands more rapidly under the effect of heat than rotating blades 14 do. In particular, the thermal portion of the gap between rotating blades 14 and housing 16 increases during acceleration of gas turbine 10. However, an increased gap impairs the efficiency of the gas turbine. An increase in the gap should therefore be avoided.

According to the present invention, devices 21 for improving the convective heat transfer within chambers 19 and thus between rotating blades 14 and stationary housing 16 are associated with rotating inner shaft 11 of gas turbine 10. Devices 21 are fixedly attached to inner shaft 11 and rotate together with inner shaft 11 about axis of rotation 12. According to FIG. 1, devices 21 for improving the convective heat transfer protrude into chambers 19 delimited by disks 17.

It should be pointed out here again that disks 17 rotate together with rotating blades 14 about axis of rotation 12. Rotating blades 14 and disks 17 therefore have the same direction of rotation and rotational speed with respect to axis of rotation 12. Devices 21 for improving convective heat transfer are fixedly attached to inner shaft 11. Devices 21 therefore rotate together with inner shaft 11 about axis of rotation 12. Inner shaft 11 and devices 21 for improving convective heat transfer therefore rotate at the same speed and in the same direction with respect to axis of rotation 12.

However, rotating inner shaft 11 has a different speed and/or different direction of rotation compared to rotating blades 14 and thus rotating disks 17 and rotating chambers 19. Therefore, inner shaft 11 rotates together with devices 21 relative to rotating blades 14 and thus relative to rotating chambers 19 delimited by disks 17.

Because devices 21 for improving convective heat transfer protrude into rotating chambers 19 and have a different direction of rotation and/or rotational speed relative to rotating chambers 19, an intensive flow is generated through rotating chambers 19, increasing the convective heat transfer in rotating chambers 19 and therefore ultimately causing a more rapid temperature change over time of rotating disks 17. This allows the different temperature variations over time of stationary housing 16 and rotating blades 14, and thus the different expansion characteristics of stationary housing 16 and rotating blades 14, to be better equalized. Rotating blades 14 and stationary housing 16 thus expand more evenly over the entire range of operation of gas turbine 10 according to the present invention. In particular, during the non-steady-state operation of gas turbine 10, a change in the gap between rotating blades 14 and housing 16 is reduced. This allows the efficiency of gas turbine 10 to be markedly improved, in particular during non-steady-state operation, which results in fuel savings and improvement in the surge limit of the compressor in gas turbine 10.

Devices 21 for improving the convective heat transfer attached to rotating inner shaft 11 may be designed as elements of any desired shape. However, the design of devices 21 shown in FIG. 2 is preferred.

Figure 2:
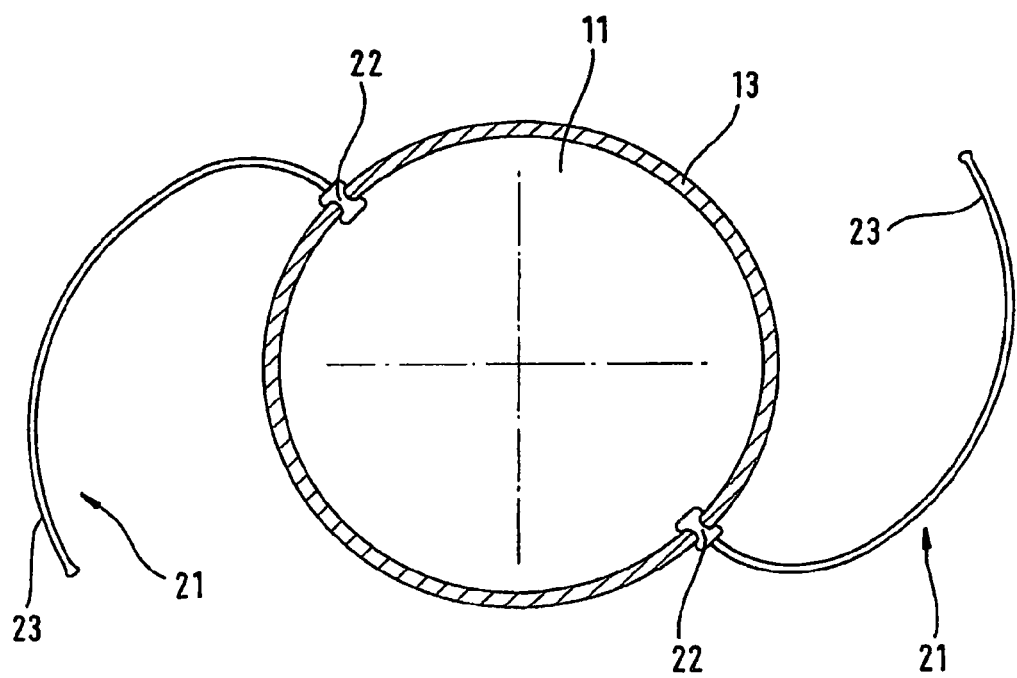
FIG. 2 shows a detail of FIG. 1 in a cross section rotated 90° from the plane of the drawing with respect to FIG. 1.

Thus, in the exemplary embodiment of FIG. 2, devices 21 for improving convective heat transfer are flexible elements made for example of flexible metal or plastic. First sections 22 of devices 21 are fixedly anchored in wall 13 of inner shaft 11. Second sections 23 opposite first sections 22 of devices 21 protrude into rotating chambers 19. Because devices 21 are designed as flexible elements in the exemplary embodiment illustrated here, they may stretch under the effect of centrifugal force. In other words, this means that the external shape of devices 21, designed as flexible elements, changes as they rotate. Devices 21 may also be designed as metal strips or metal wires or metallic elements of any desired shape. The flexible elements may also protrude into chambers 19 to different depths. The length of the above-described device may be changed, i.e., adjusted, via a mechanism integrated into the shaft. Also conceivable are rigid elements which are suitable for deflecting axially flowing air into the chamber due to their shape and which have a radial dimension that is not greater than the hubs of the disks, so that they are installable on the shaft, i.e., may be pushed through the hubs.

Therefore, it is within the scope of the present invention to increase the convective heat transfer in the rotating chambers of a gas turbine or a propulsion unit or another rotating device. This allows the different temperature variations over time of rotating units of a gas turbine 10, namely rotating blades 14 and rotating disks 17 attached to rotating blades 14, and stationary units, namely stationary housing 16, to be equalized. For this purpose, the above-mentioned devices 21 for improving convective heat transfer are associated with inner shaft 11 of gas turbine 10.

Devices 21 therefore rotate together with inner shaft 11 about axis of rotation 12. Devices 21 for improving convective heat transfer and inner shaft 11 rotate at the same speed and in the same direction of rotation. Disks 17 associated with rotating blades 14 form chambers 19. Rotating blades 14 and disks 17 also rotate at the same speed and in the same direction about axis of rotation 12, but relative to inner shaft 11 and devices 21. However, the rotary motions of devices 21 and of chambers 19 delimited by disks 17 differ with respect to their rotational speed and/or the direction of rotation. Devices 21 for improving convective heat transfer protruding into chambers 19 therefore move with respect to chambers 19 and disks 17, ensuring an intensive flow through chambers 19 and ultimately increasing the convective heat transfer in the rotating chambers.

Although the present invention has been described using the example of a gas turbine, it is not limited to this specific application. Rather, the present invention is applicable wherever heat transfer is to be influenced in rotating devices. Therefore, the area of application is not limited to gas turbines and other propulsion units in aeronautics, although this application is preferred and is particularly advantageous.

LIST OF REFERENCE NUMERALS gas turbine 10
inner shaft 11
axis of rotation 12
wall 13
rotating blade 14
guide vane 15
housing 16
disks 17
shroud 18
chamber 19
wall 20
device 21
section 22
section 23

The invention claimed is:

1. A gas turbine comprising:

a rotating inner shaft;

a stationary housing;

a rotor assembly, the rotor assembly including a plurality of rotating blades, the rotating blades, the rotor assembly, and the inner shaft rotating about a common axis and relative to one another;

wherein at least one device is associated with the inner shaft, the at least one device being positioned to improve convective heat transfer in the gas turbine; and wherein the at least one device further comprises a flexible element, and wherein an external shape of the flexible element changes during rotation.

2. The gas turbine as recited in claim 1, wherein:

the rotating inner shaft rotates about an axis and the axis extends in an axial direction;

the plurality of rotating blades are arranged in series in the axial direction;

a corresponding component extends between each of the plurality of rotating blades and the inner shaft, a plurality of rotating chambers each being defined by two adjacent ones of the components;

the at least one device includes a plurality of devices, the plurality of devices radially protruding from the inner shaft into the chambers defined by the components.

3. The gas turbine as recited in claim 2, wherein the plurality of devices protrudes into its associated chamber to different distances than other ones of the plurality of devices.

4. The gas turbine as recited in claim 2, wherein the plurality of devices rotate together with the inner shaft, and the components rotate together with the rotating blades.

5. The gas turbine as recited in claim 2, wherein the plurality of devices and the components rotate in different directions of rotation and/or at different speeds relative to one another.

6. The gas turbine as recited in claim 1, wherein the external shape stretches during rotation.

* * * * *